(12) United States Patent
Miyamoto et al.

(10) Patent No.: US 7,557,868 B2
(45) Date of Patent: Jul. 7, 2009

(54) LIQUID CRYSTAL PROJECTOR DEVICE

(75) Inventors: Masaaki Miyamoto, Osaka (JP); Kazuya Minami, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 145 days.

(21) Appl. No.: 11/797,126

(22) Filed: May 1, 2007

(65) Prior Publication Data
US 2007/0258047 A1 Nov. 8, 2007

(30) Foreign Application Priority Data
May 2, 2006 (JP) .............................. 2006-128733

(51) Int. Cl.
*G02F 1/1335* (2006.01)
(52) U.S. Cl. .............................................. 349/5; 349/9
(58) Field of Classification Search .................... 349/5, 349/9
See application file for complete search history.

(56) References Cited

FOREIGN PATENT DOCUMENTS

| | | | |
|---|---|---|---|
| CN | 1434347 A | 8/2003 | |
| JP | 2003-262921 A | 9/2003 | |
| JP | 2004-205593 A | 7/2004 | |
| JP | 2005-283842 A | 10/2005 | |
| JP | 2006-039087 A | 2/2006 | |

OTHER PUBLICATIONS

Japanese Office Action dated May 20, 2008 (mailing date), issued in corresponding Japanese Patent Application No. 2006-128733.
Chinese Office Action dated Jan. 9, 2009, Application No. 200710102939.9.

*Primary Examiner*—David Y Chung
(74) *Attorney, Agent, or Firm*—Westerman, Hattori, Daniels & Adrian, LLP.

(57) ABSTRACT

A liquid crystal projector device of the present invention includes three image generating units for generating image light of three primary colors. Each image generating unit has a polarizing plate and an optical compensating plate held by a combination frame and placed on a support base. The combination frame includes a polarizing plate frame for holding the polarizing plate, and a compensating plate frame for holding the optical compensating plate. The polarizing plate frame is supported on the support base via a rotation adjustment mechanism for rotating the polarizing plate about the optical axis, while the compensating plate frame is supported on the polarizing plate frame via an inclination adjustment mechanism for inclining the optical compensating plate by rotating the optical compensating plate about two axes perpendicular to the optical axis and perpendicular to each other.

3 Claims, 9 Drawing Sheets

LIQUID CRYSTAL PROJECTOR DEVICE

The priority application Number 2006-128733 upon which this patent application is based is hereby incorporated by reference.

BACKGROUND OF THE INVENTION

1. Field of the Invention

The present invention relates to a liquid crystal projector device adapted to guide light from a light source to an optical system to generate images for magnification projection on a forward screen.

2. Description of Related Art

A liquid crystal projector device has three image generating units for generating image light of three primary colors, each including an outgoing side polarizing plate, a pre-polarizing plate, a liquid crystal panel, an optical compensating plate, and an incidence side polarizing plate, which are sequentially placed (see, for example, JP 2006-39087, A). FIG. 15 shows an optical compensating plate 57 and an incidence side polarizing plate 58 held by a turning member 40 adjustable in inclination angle relative to the optical axis, and adjustable in rotation angle within a plane perpendicular to the optical axis, in order to adjust the white and black contrast of the color image light.

The turning member 40 is attached via an auxiliary member 42 to a fixing member 34. The auxiliary member 42 has a long hole 36 extending in the direction perpendicular to the optical axis. A screw 35 is screwed into the long hole 36 to attach the auxiliary member 42 to the fixing member 34. The turning member 40 has a pair of long holes 41, 41 extending in the direction parallel to the optical axis. A pair of screws 43, 43 are screwed into the pair of long holes 41, 41 to attach the turning member 40 to the auxiliary member 42.

In adjusting the rotation angle of the incidence side polarizing plate 58 held by the turning member 40, the screw 35, which has attached the auxiliary member 42 to the fixing member 34, is loosened to allow the auxiliary member 42 to slide along the long hole 36. This causes the incidence side polarizing plate 58 to rotate to make a so-called black adjustment.

In adjusting the inclination angle of the optical compensating plate 57 held by the turning member 40, one of the screws 43, which has attached the turning member 40 to the auxiliary member 42, is loosened to allow the turning member 40 to slide along the corresponding long hole 41. This varies the inclination angle of the optical compensating plate 57 to make a so-called color shading correction.

However, there has been a problem. Because the conventional liquid crystal projector device employs moving the incidence side polarizing plate 58 together with the optical compensating plate 57, the incidence side polarizing plate 58 is caused to incline at the same time when the inclination angle of the optical compensating plate 57 is adjusted after a rotation angle adjustment is made to the incidence side polarizing plate 58. This inclination of the incidence side polarizing plate 58 deteriorates the quality of color images.

SUMMARY OF THE INVENTION

Accordingly, an object of the present invention is to provide a liquid crystal projector device in which the polarizing plate remains perpendicular to the optical axis even though inclination angle adjustments are made to the optical compensating plate and rotation angle adjustments are made to the polarizing plate.

A liquid crystal projector device of the present invention includes an optical device 3 for generating color image light, and a projection lens 20 for projecting the color image light generated by the optical device 3 toward a screen. The optical device 3 includes three image generating units 50, 60, 70 for generating image light of three primary colors, and a color synthesis prism 30 for synthesizing the image light of three primary colors generated by the three image generating units 50, 60, 70 into color image light. The three image generating units 50, 60, 70 each have a liquid crystal panel and a polarizing plate arranged on the optical axis, and have an optical compensating plate arranged between the liquid crystal panel and the polarizing plate for compensating birefringence of light caused by the liquid crystal panel.

The polarizing plate and the optical compensating plate of each image generating unit are held by a combination frame 9 and placed on a support base 8. The combination frame 9 includes a polarizing plate frame 90 for holding the polarizing plate, and a compensating plate frame 91 for holding the optical compensating plate. The polarizing plate frame 90 is supported on the support base 8 via a rotation adjustment mechanism 92 for rotating the polarizing plate about the optical axis, while the compensating plate frame 91 is supported on the polarizing plate frame 90 via an inclination adjustment mechanism 93 for inclining the optical compensating plate by rotating the optical compensating plate about two axes perpendicular to the optical axis and perpendicular to each other.

According to the liquid crystal projector device of the present invention, operating the rotation adjustment mechanism 92 causes the entire combination frame 9 to rotate on the optical axis, causing both the polarizing plate held by the polarizing plate frame 90 and the optical compensating plate held by the compensating plate frame 91 to rotate simultaneously on the optical axis. This rotation of the polarizing plate makes a black adjustment. At this time, the optical compensating plate also rotates, but this will not change the color shading adjustment status.

Operating the inclination adjustment mechanism 93 after the black adjustment causes the compensating plate frame 91 to rotate about the two axes with the polarizing plate frame 90 remaining still, causing the optical compensating plate held by the compensating plate frame 91 to rotate about the two axes to vary its inclination angles. This adjustment of the inclination angles of the optical compensating plate makes a color shading correction. At this time, the polarizing plate remains still without inclining with the optical compensating plate, which therefore prevents causing changes of the black adjustment status or deterioration of image quality.

Specifically, the rotation adjustment mechanism 92 of each of the image generating units includes a circular arc guide surface 80 formed on the support base 8 and having a central axis parallel to the optical axis of each image generating unit, a circular arc sliding piece 94 projecting from the polarizing plate frame 90 and slidable on the circular arc guide surface 80, and fixing means for fixing the circular arc sliding piece 94 to the circular arc guide surface 80.

According to this specific configuration, application of rotary force about the optical axis to the combination frame 9 causes the circular arc sliding piece 94 to slide along the circular arc guide surface 80 to guide rotation of the combination frame 9 about the central axis parallel to the optical axis. As a result, the polarizing plate and optical compensating plate accurately rotate on the optical axis. If the fixing means fixes the circular arc sliding piece 94 to the circular arc guide surface 80 after the adjustment of the rotation angle, the polarizing plate frame 90 will not move to maintain the rotation angle of the polarizing plate in its adjusted state.

Specifically, the inclination adjustment mechanism 93 of each of the image generating units includes a support pin 96 projecting from one end of the polarizing plate frame 90, a cut 97 provided by recessing one end of the compensating plate frame 91 and in loose engagement with the support pin 96, two engagement pins 98, 98 projecting from the other end of the polarizing plate frame 90, two engagement holes 99, 99 opened at the other end of the compensating plate frame 91 for the engagement pins 98, 98 to extend therethrough, and fixing means for fixing the compensating plate frame 91 to the polarizing plate frame 90. Each engagement pin 98 includes a thin shank 87 longer than the thickness of the compensating plate frame 91, and a thick shank 88 projecting from the top end of the thin shank 87. Each engagement hole 99 is sized for the thin shank 87 of the corresponding engagement pin 98 to loosely extend therethrough.

According to this specific configuration, application of force about a first axis of the two axes to the compensating plate frame 91 causes the compensating plate frame 91 to have the two engagement holes 99, 99 moved in a same direction along the respective thin shanks 87, 87 within the axial allowances of the engagement holes 99 relative to the thin shanks 87 of the engagement pins 98. This causes the compensating plate frame 91 to rotate on the support pin 96 about the first axis to vary an inclination angle of the optical compensating plate.

In addition, application of force about a second axis of the two axes to the compensating plate frame 91 causes the compensating plate frame 91 to have the two engagement holes 99, 99 moved in opposite directions along the respective thin shanks 87, 87 within the axial allowances of the engagement holes 99 relative to the thin shanks 87 of the engagement pins 98. This causes the compensating plate frame 91 to rotate on the support pin 96 about the second axis to vary an inclination angle of the optical compensating plate. If the fixing means fixes the compensating plate frame 91 to the polarizing plate frame 90 after the adjustment of the inclination angles, the compensating plate frame 91 will not move to maintain the inclination angles of the optical compensating plate in its adjusted state.

As described above, according to the liquid crystal projector device of the present invention, the polarizing plate remains perpendicular to the optical axis even though rotation angle adjustments are made to the polarizing plate and inclination angle adjustments are made to the optical compensating plate. This can provide high-quality color images.

DETAILED DESCRIPTION OF THE INVENTION

Figure 1:
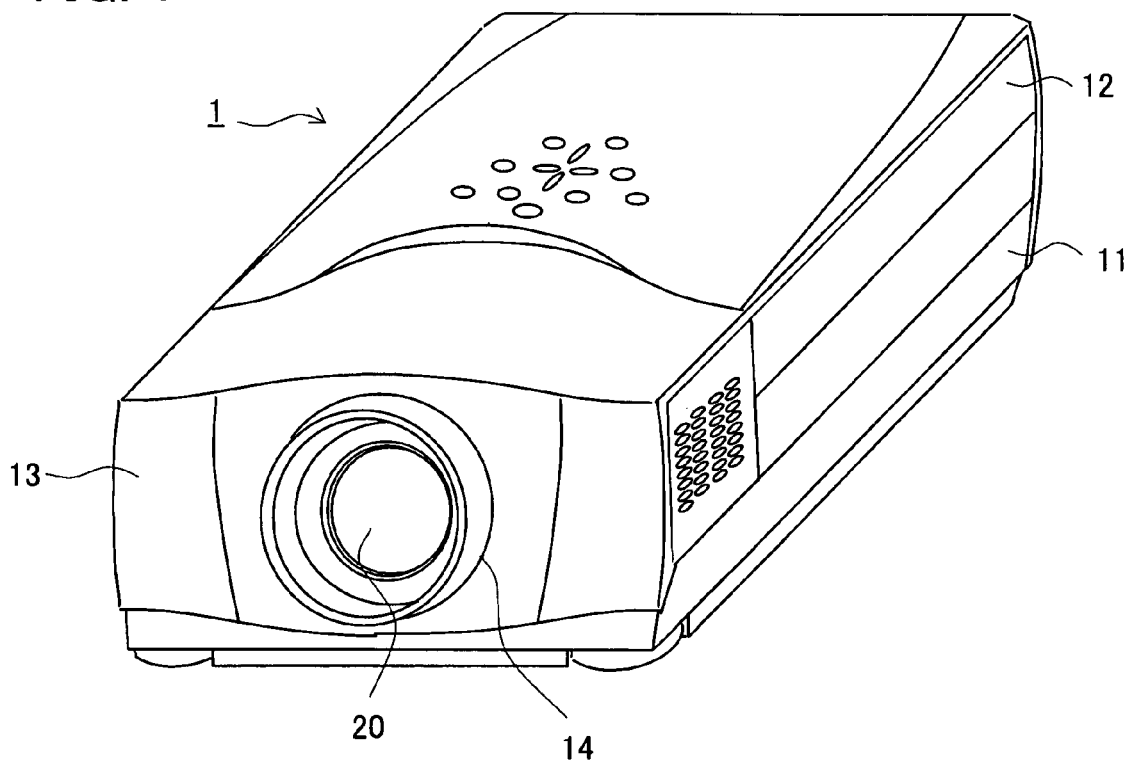
FIG. 1 is a perspective view showing a liquid crystal projector device of the present invention as a whole.
Figure 2:
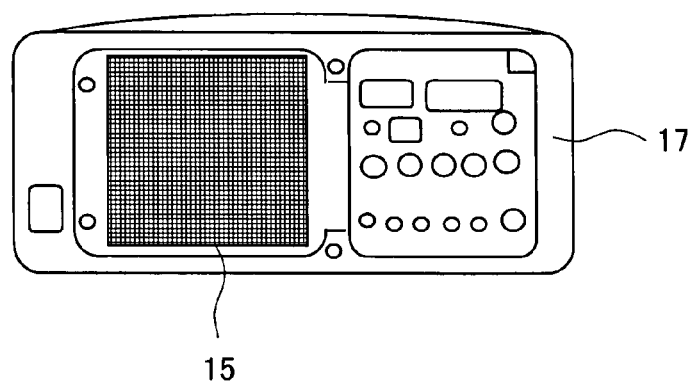
FIG. 2 is a back view of the liquid crystal projector device.
Figure 3:
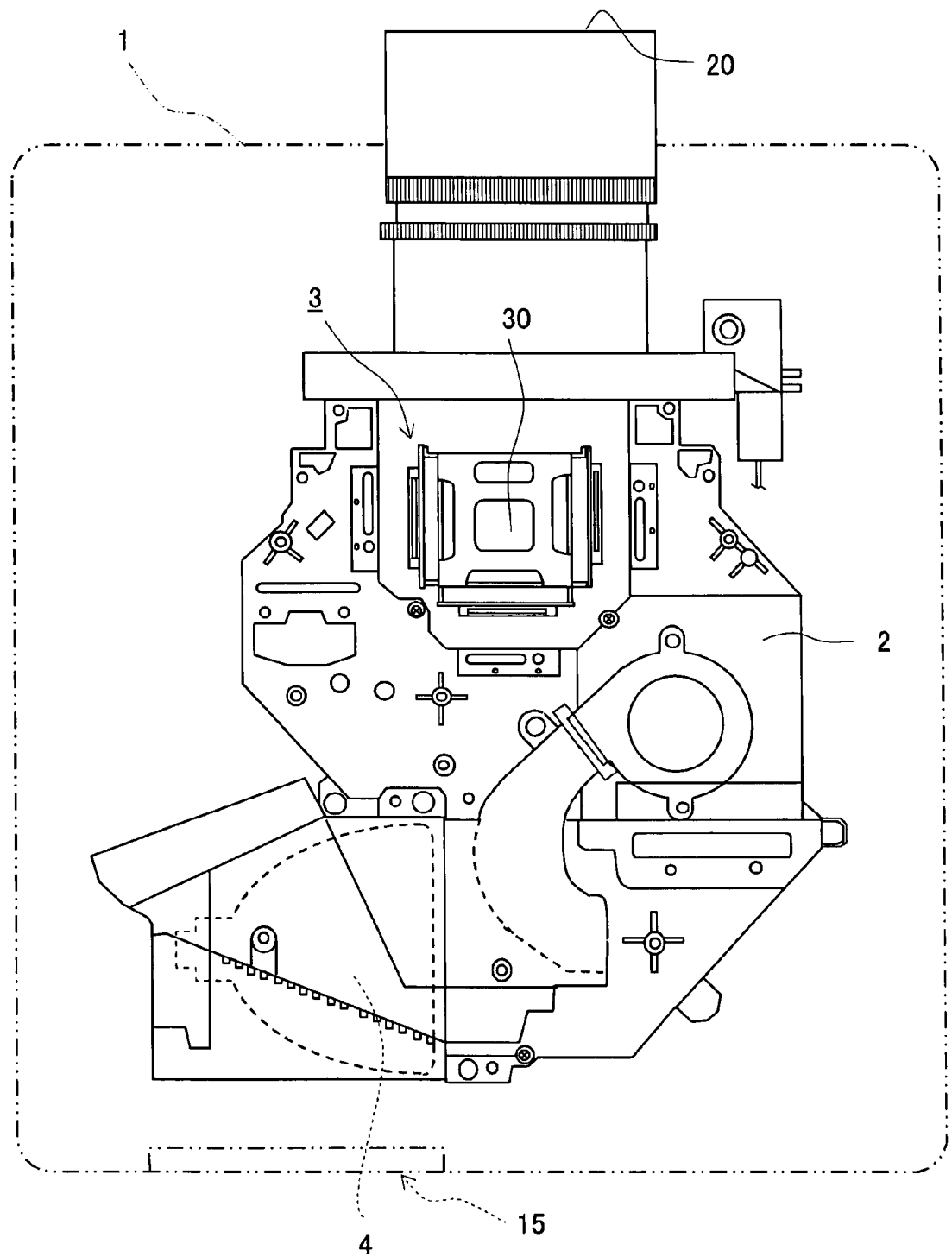
FIG. 3 is a plan view showing an arrangement of a lamp unit and an optical unit mounted in the liquid crystal projector.

An embodiment of the present invention will be specifically described below with reference to the drawings. As shown in FIG. 1, a liquid crystal projector device of the present invention includes a flat casing 1 including a lower half case 11 and an upper half case 12. The casing 1 has a front panel 13 provided with a projection window 14. As shown in FIG. 2, a rear panel 17 is provided with an exhaust vent 15 for warm air exhausted from a built-in lamp unit. Arranged inside the casing 1 are, as shown in FIG. 3, an optical unit 2 for generating image light, and a lamp unit 4 providing a light source for the optical unit 2.

Optical Unit

Figure 4:
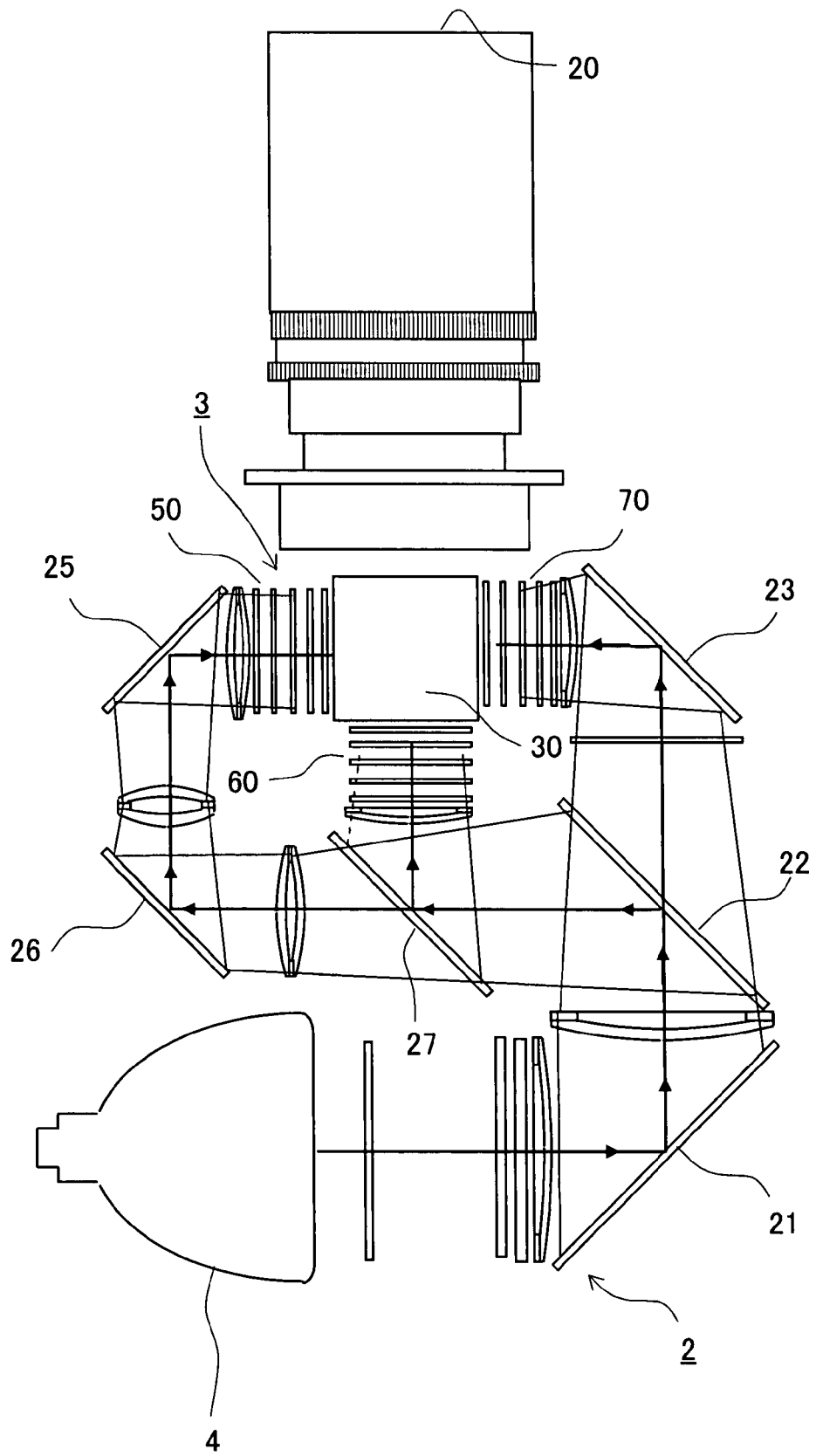
FIG. 4 is a plan view showing an optical system of the lamp unit and the optical unit mounted in the liquid crystal projector.

As shown in FIG. 4, in the optical unit 2, white light from the lamp unit 4 falls on a first field mirror 21, and is reflected by the first field mirror 21 to fall on a first dichroic mirror 22. The first dichroic mirror 22 reflects red light and green light, so that only blue light passes through the first dichroic mirror 22. The blue light that has passed through the first dichroic mirror 22 falls on a second field mirror 23, and is reflected by the second field mirror 23 to enter an optical device 3.

The red and green light reflected by the first dichroic mirror 22 falls on a second dichroic mirror 27. The second dichroic mirror 27 reflects the green light. The green light reflected by the second dichroic mirror 27 enters the optical device 3.

The red light incident on the second dichroic mirror 27 passes through the second dichroic mirror 27, and is reflected by a third field mirror 26 and a fourth field mirror 25 to enter the optical device 3.

Optical Device

Figure 7:
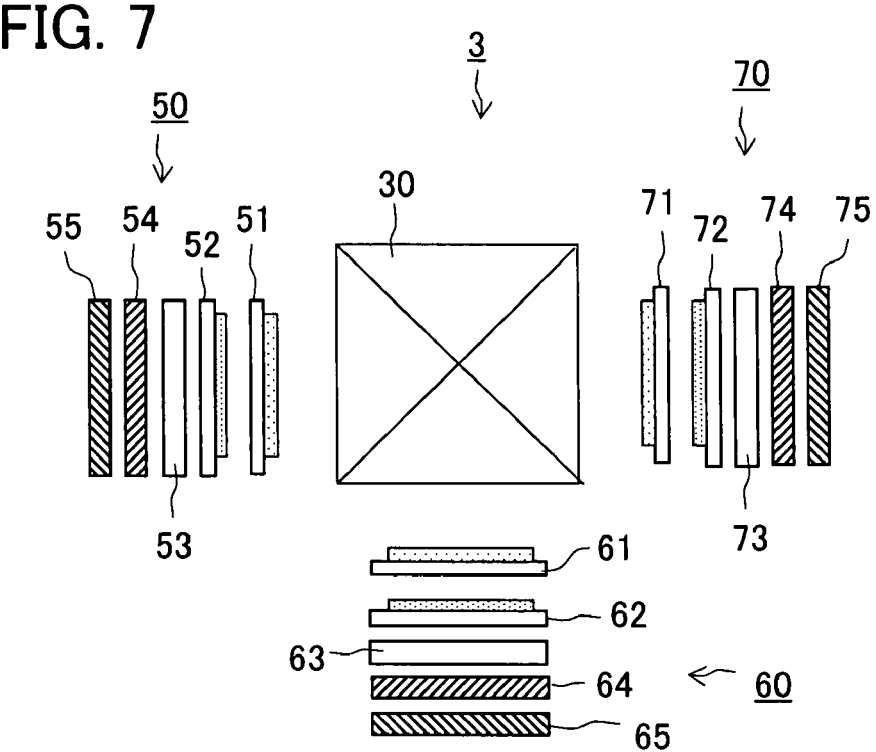
FIG. 7 is a plan view of the optical device.

As shown in FIG. 7, the optical device 3 includes a color synthesis prism 30, and a red image generating unit 50, a green image generating unit 60 and a blue image generating unit 70, which are arranged around the color synthesis prism 30.

The red image generating unit 50, green image generating unit 60 and blue image generating unit 70 include outgoing side polarizing plates 51, 61, 71, pre-polarizing plates 52, 62, 72, liquid crystal panels 53, 63, 73, optical compensating plates 54, 64, 74, and incidence side polarizing plates 55, 65, 75, respectively, which are arranged sequentially from the color synthesis prism 30.

The blue light that has entered the optical device 3 passes through the incidence side polarizing plate 75, optical compensating plate 74, liquid crystal panel 73, pre-polarizing plate 72, and outgoing side polarizing plate 71 of the blue image generating unit 70 to become blue image light, and is guided to the color synthesis prism 30.

The green light that has entered the optical device 3 passes through the incidence side polarizing plate 65, optical compensating plate 64, liquid crystal panel 63, pre-polarizing plate 62, and outgoing side polarizing plate 61 of the green image generating unit 60 to become green image light, and is guided to the color synthesis prism 30.

The red light that has entered the optical device 3 passes through the incidence side polarizing plate 55, optical compensating plate 54, liquid crystal panel 53, pre-polarizing plate 52, and outgoing side polarizing plate 51 of the red image generating unit 50 to become red image light, and is guided to the color synthesis prism 30.

The image light of the three colors guided to the color synthesis prism 30 is synthesized by the color synthesis prism 30, and the resulting color image light is magnifyingly projected through a projection lens 20 onto a forward screen.

At this time, black adjustments are made by rotating the incidence side polarizing plates 55, 65, 75 of the red image generating unit 50, green image generating unit 60 and blue image generating unit 70 about the optical axis. Color shading corrections are made by rotating the optical compensating plates 54, 64, 74 about a first axis (horizontal axis) and a second axis (vertical axis) perpendicular to the optical axis and perpendicular to each other, and inclining them in two directions.

Figure 6:
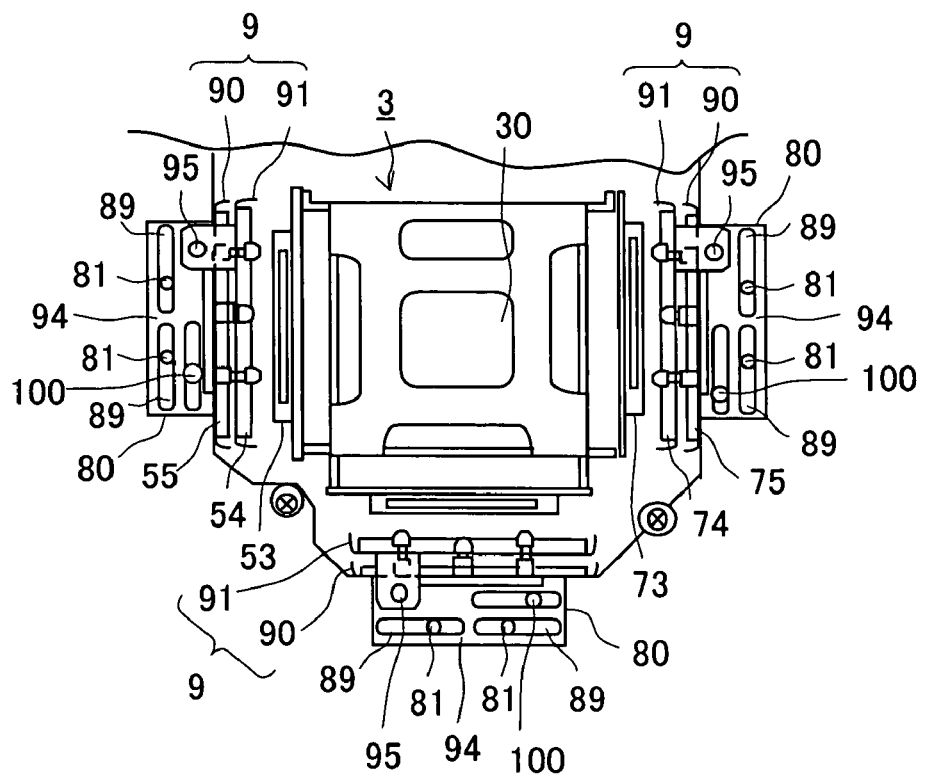
FIG. 6 is a plan view of the optical device with combination holders attached thereto.

FIG. 6 shows adjustment mechanisms provided in the respective image generating units for the black adjustments and color shading corrections.

Figure 8:
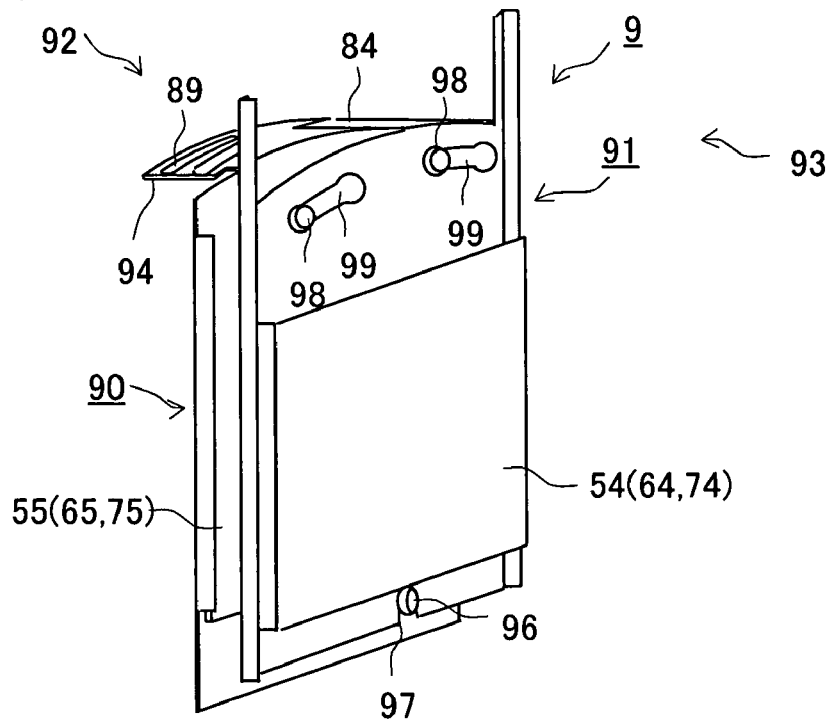
FIG. 8 is a side perspective view of a combination holder.

As shown in FIG. 8, the incidence side polarizing plate 55, 65, 75 and optical compensating plate 54, 64, 74 of each image generating unit are held by a combination frame 9 of each image generating unit. The combination frame 9 includes a polarizing plate frame 90 for holding the corresponding incidence side polarizing plate 55, 65, 75, and a compensating plate frame 91 for holding the corresponding optical compensating plate 54, 64, 74.

Figure 12:
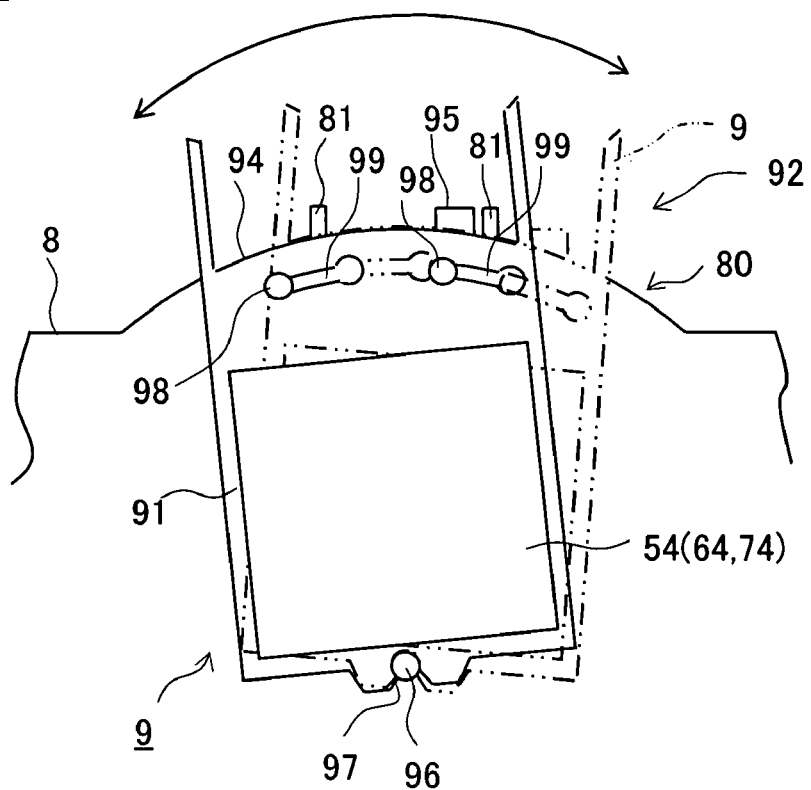
FIG. 12 is a front view illustrating rotation angle adjustments with a rotation adjustment mechanism.
Figure 13:
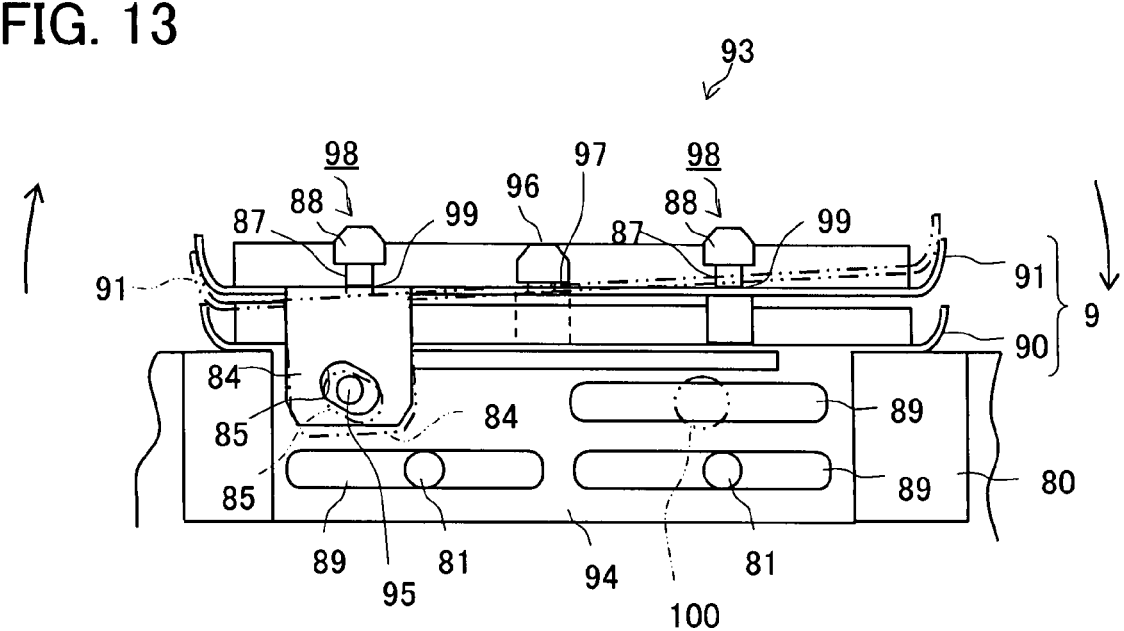
FIG. 13 is a plan view illustrating horizontal inclination angle adjustments with an inclination adjustment mechanism.
Figure 14:
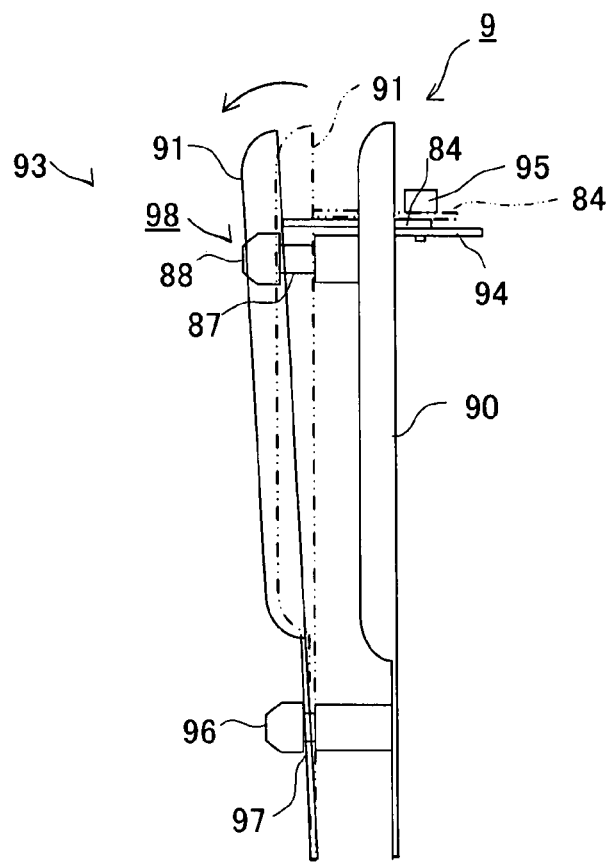
FIG. 14 is a plan view illustrating vertical inclination angle adjustments with the inclination adjustment mechanism.
Figure 15:
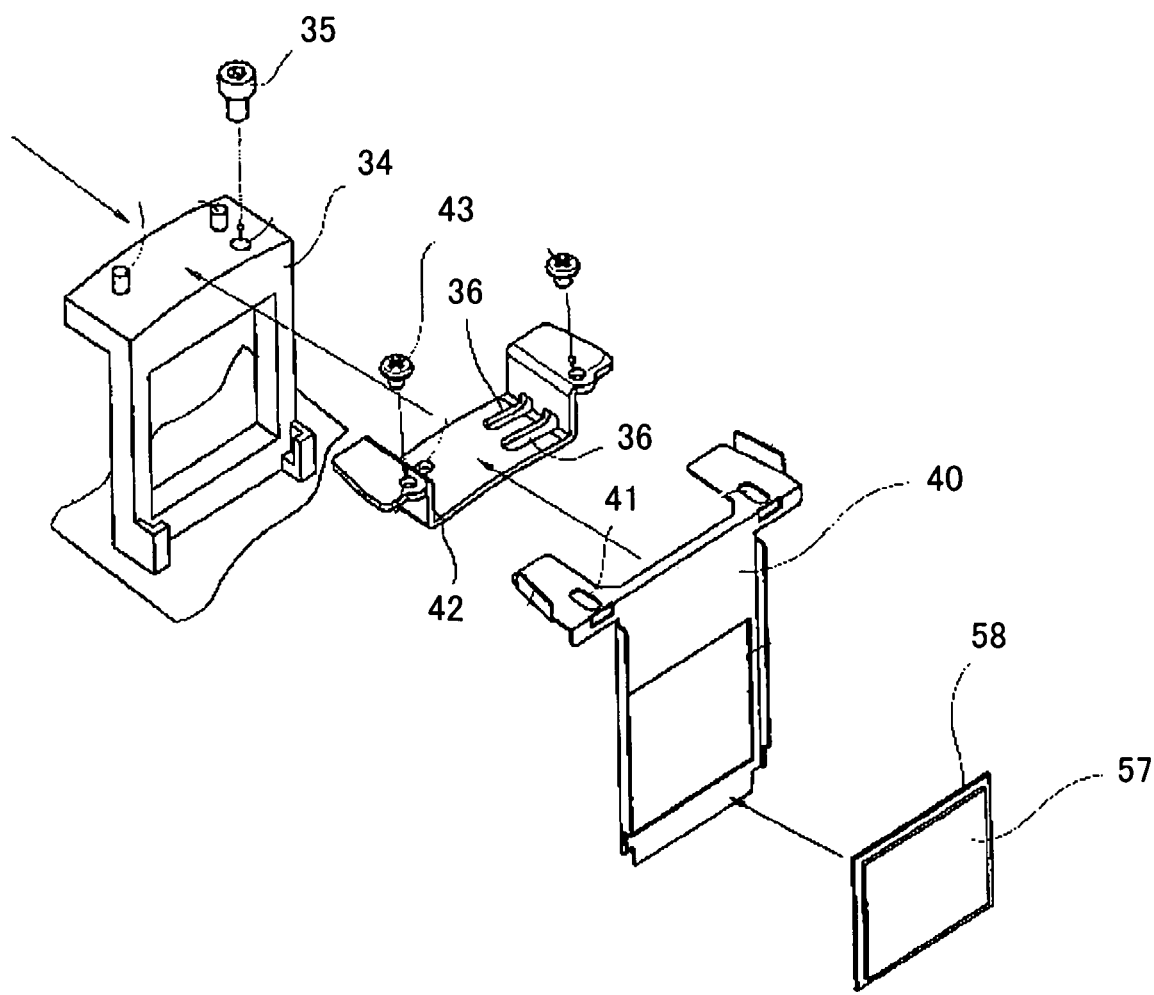
FIG. 15 is an exploded perspective view of a conventional adjustment mechanism.

The polarizing plate frame 90 is placed on a support base 8 via a rotation adjustment mechanism 92, as shown in FIG. 12, for rotating the incidence polarizing plate about the optical axis. The compensating plate frame 91 is supported on the polarizing plate frame 90 via an inclination adjustment mechanism 93, as shown in FIG. 13 and FIG. 14, for rotating the optical compensating plate about the first axis and second axis, and inclining it in two directions. The rotation adjustment mechanism 92 and inclination adjustment mechanism 93 will be described below in detail.

Rotation Adjustment Mechanism 92

Figure 5:
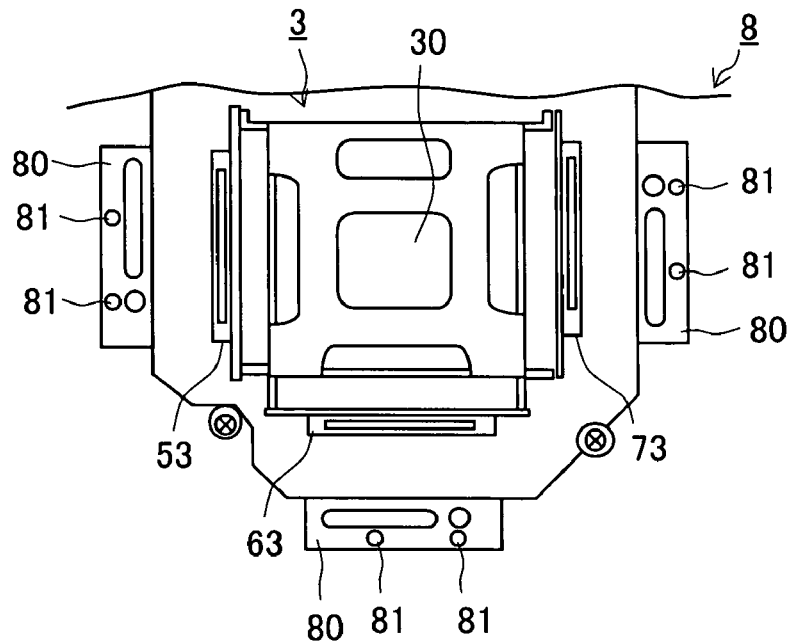
FIG. 5 is a plan view of an optical device fixed portion.

As shown in FIG. 5, the support base 8, made of a synthetic resin, is provided in place in the casing 1, surrounding the optical device 3. The support base 8 has a circular arc guide surface 80 arranged at three locations surrounding the optical device 3 for supporting the combination frame 9 of each image generating unit. Each circular arc guide surface 80 is formed to be a circular arc surface having its center on a horizontal axis parallel to the optical axis.

Figure 10:
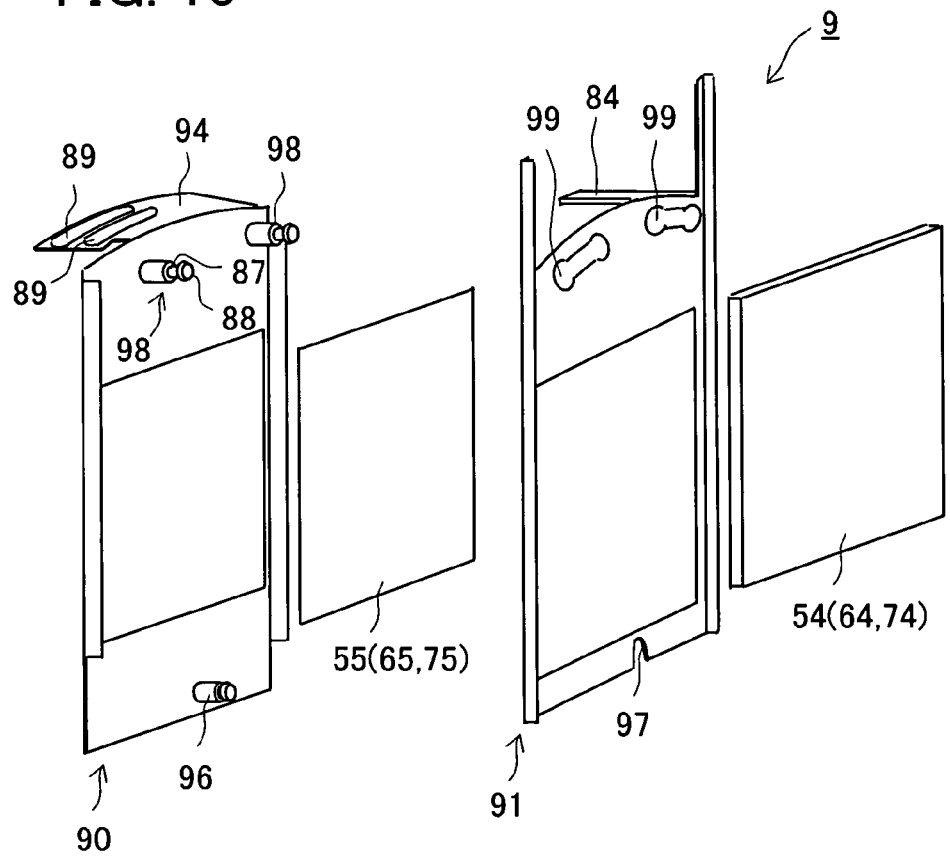
FIG. 10 is an exploded perspective view of the combination holder.

As shown in FIG. 10, the polarizing plate frame 90 has a circular arc sliding piece 94 horizontally projecting from the upper end edge thereof and having a circular arc surface with the curvature identical to that of the circular arc guide surface 80. The circular arc sliding piece 94 is in slidable contact with the circular arc guide surface 80 of the support base 8 as shown in FIG. 6, and guides rotation of the polarizing plate frame 90 about a horizontal axis parallel to the optical axis.

Figure 9:
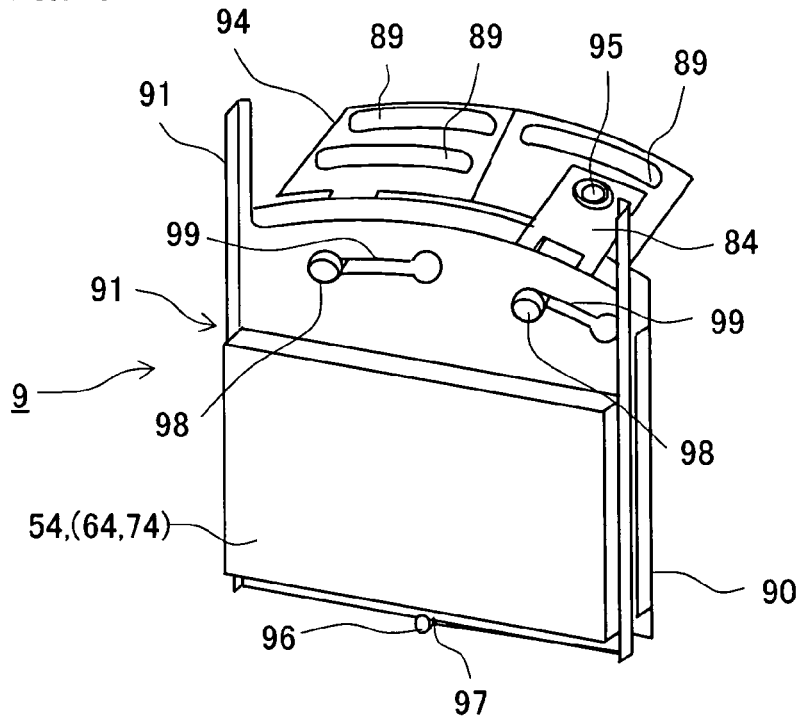
FIG. 9 is a top perspective view of the combination holder.

As shown in FIG. 9, the circular arc sliding piece 94 has three circumferentially extending long through holes 89, 89, 89. As shown in FIG. 6, two projections 81, 81 on the support base 8 are fitted in two of the through holes 89, 89 to restrict the circular arc sliding piece 94 to sliding on the circular arc line. A screw 100 extends through the remaining through hole 89, with its point screwed into the support base 8 enabling the circular arc sliding piece 94 to be fixed onto the circular arc guide surface 80.

The rotation adjustment mechanism 92 is configured such that applying rotary force about the optical axis to the combination frame 9 with the screw 100 loosened causes the circular arc sliding piece 94, as shown in FIG. 12, to slide along the circular arc guide surface 80 to guide rotation of the combination frame 9 about the central axis parallel to the optical axis. As a result, the polarizing plate and optical compensating plate accurately rotate on the optical axis.

Tightening the screw 100 after the rotation angle adjustment fixes the circular arc sliding piece 94 to the circular arc guide surface 80. This prevents the polarizing plate frame 90 from moving, and maintains the rotation angle of the polarizing plate in its adjusted state.

Inclination Adjustment Mechanism 93

As shown in FIG. 10, a support pin 96 projects from the lower end of the polarizing plate frame 90, while two engagement pins 98, 98 project from opposite sides at the upper end of the polarizing plate frame 90. In contrast, the compensating plate frame 91 has a cut 97 provided at the lower end thereof for loosely engaging the support pin 96 of the polarizing plate frame 90.

The compensating plate frame 91 has two engagement holes 99, 99 opened at the upper end thereof for the two engagement pins 98, 98 of the polarizing plate frame 90 to extend therethrough. Each engagement hole 99 extends on a circular arc line having its center on the support pin 96 of the polarizing plate frame 90, with one end thereof enlarged to thereby enable insertion of the corresponding engagement pin 98 into the engagement hole 99 at the time of assembling.

Figure 11:
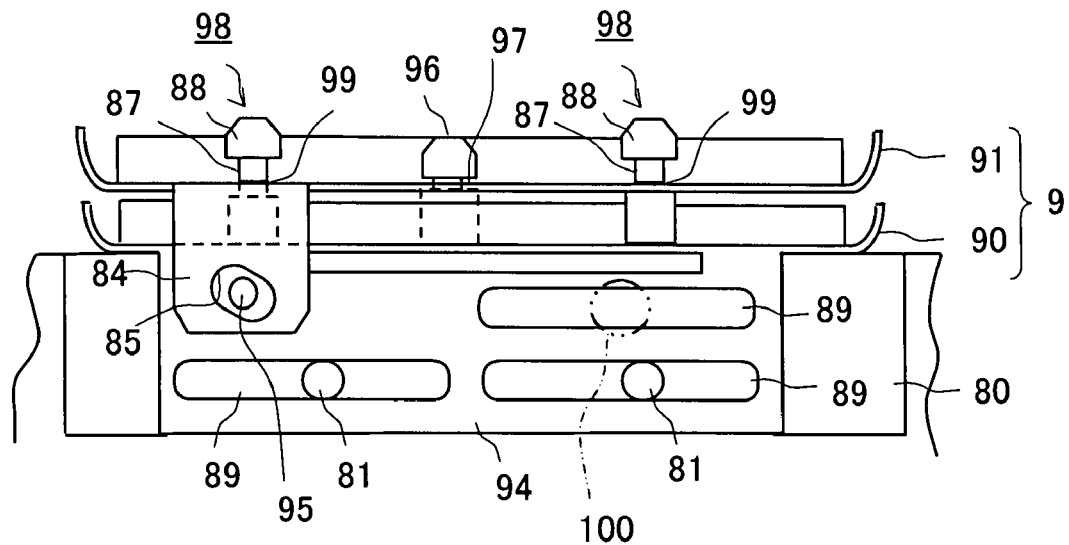
FIG. 11 is a plan view of the combination holder supported by a base.

As shown in FIG. 11, each engagement pin 98 includes a thin shank 87 longer than the thickness of the compensating plate frame 91, and a thick shank 88 projecting from the top end of the thin shank 87. Each engagement hole 99 of the compensating plate frame 91 shown in FIG. 10 is formed such that its diametrical width is greater than the diameter of the thin shank 87 of the corresponding engagement pin 98 and smaller than the diameter of the thick shank 88 of the engagement pin 98.

An extension 84 is formed on the upper end edge of the compensating plate frame 91. As shown in FIG. 11, the extension 84 has a long hole 85 extending on a circular arc line having its center at the position of the support pin 96.

As shown in FIG. 9, a screw 95 extends through the long hole 85 of the compensating plate frame 91, with its end screwed in the circular arc sliding piece 94 of the polarizing plate frame 90. The long hole 85 is formed such that its diametrical width is slightly greater than the diameter of the screw 95.

Therefore, applying force about the first axis to the compensating plate frame 91 with the screw 95 loosened causes the compensating plate frame 91, as shown in FIG. 14, to have the two engagement holes 99, 99 moved in a same direction along the respective thin shanks 87, 87 within the axial allowances of the engagement holes 99 relative to the thin shanks 87 of the engagement pins 98. This causes the compensating plate frame 91 to rotate on the support pin 96 about the first axis (horizontal axis) to vertically vary the inclination angle of the optical compensating plate.

In addition, applying force about the second axis to the compensating plate frame 91 causes the compensating plate frame 91, as shown in FIG. 13, to have the two engagement holes 99, 99 moved in opposite directions along the respective thin shanks 87, 87 within the axial allowances of the engagement holes 99 relative to the thin shanks 87 of the engagement pins 98. This causes the compensating plate frame 91 to rotate on the support pin 96 about the second axis (vertical axis) to horizontally vary the inclination angle of the optical compensating plate.

Tightening the screw 95 shown in FIG. 9 after the inclination angle adjustment fixes the extension 84 of the compensating plate frame 91 to the circular arc sliding piece 94 of the polarizing plate frame 90. This prevents the compensating plate frame 91 from moving, and maintains the inclination angles of the optical compensating plate in its adjusted state.

The liquid crystal projector device of the present invention has the rotation adjustment mechanism 92 that makes the polarizing plate rotation angle adjustment, in which the compensating plate frame 91 also rotates together with the polarizing plate frame 90. This causes the optical compensating plate to rotate, but will not change the color shading adjustment status.

After the rotation adjustment mechanism 92 makes the polarizing plate rotation angle adjustment, the inclination adjustment mechanism 93 makes the optical compensating plate inclination angle adjustment, in which only the compensating plate frame 91 rotates, with the polarizing plate frame 90 remaining fixed on the support base 8. Therefore, the polarizing plate will not incline with the optical compensating plate, which prevents causing changes of the black adjustment status or deterioration of image quality.

The present invention is not limited to the foregoing embodiment in construction but can be modified variously by one skilled in the art without departing from the spirit of the invention as set forth in the appended claims. For example, the rotation adjustment mechanism 92 and inclination adjustment mechanism 93 are not limited to the above-described mechanisms, but may be configured using various known mechanisms.

What is claimed is:

1. A liquid crystal projector device comprising an optical device 3 for generating color image light, and a projection lens 20 for projecting the color image light generated by the optical device 3' toward a screen, the optical device 3 comprising three image generating units 50, 60, 70 for generating image light of three primary colors, and a color synthesis prism 30 for synthesizing the image light of three primary colors generated by the three image generating units 50, 60, 70 into color image light, the three image generating units 50, 60, 70 each having a liquid crystal panel and a polarizing plate arranged on the optical axis, and having an optical compensating plate arranged between the liquid crystal panel and the polarizing plate for compensating birefringence of light caused by the liquid crystal panel, the polarizing plate and the optical compensating plate of each image generating unit being held by a combination frame 9 and placed on a support base 8, the combination frame 9 comprising a polarizing plate frame 90 for holding the polarizing plate, and a compensating plate frame 91 for holding the optical compensating plate, the polarizing plate frame 90 being supported on the support base 8 via a rotation adjustment mechanism 92 for rotating the polarizing plate about the optical axis, the compensating plate frame 91 being supported on the polarizing plate frame 90 via an inclination adjustment mechanism 93 for inclining the optical compensating plate by rotating the optical compensating plate about two axes perpendicular to the optical axis and perpendicular to each other.

2. The liquid crystal projector device according to claim 1, wherein the rotation adjustment mechanism 92 of each of the image generating units comprises a circular arc guide surface 80 formed on the support base 8 and having a central axis parallel to the optical axis of each image generating unit, a circular arc sliding piece 94 projecting from the polarizing plate frame 90 and slidable on the circular arc guide surface 80, and fixing means for fixing the circular arc sliding piece 94 to the circular arc guide surface 80.

3. The liquid crystal projector device according to claim 1, wherein the inclination adjustment mechanism 93 of each of the image generating units comprises a support pin 96 projecting from one end of the polarizing plate frame 90, a cut 97 provided by recessing one end of the compensating plate frame 91 and in loose engagement with the support pin 96, two engagement pins 98, 98 projecting from the other end of the polarizing plate frame 90, two engagement holes 99, 99 opened at the other end of the compensating plate frame 91 for the engagement pins 98, 98 to extend therethrough, and fixing means for fixing the compensating plate frame 91 to the polarizing plate frame 90, each engagement pin 98 comprising a thin shank 87 longer than the thickness of the compensating plate frame 91, and a thick shank 88 projecting from the top end of the thin shank 87, each engagement hole 99 being sized for the thin shank 87 of the corresponding engagement pin 98 to loosely extend therethrough.

* * * * *